United States Patent
Graham

[15] 3,689,104
[45] Sept. 5, 1972

[54] VEHICLE OCCUPANT SAFETY BARRIER

[72] Inventor: Phillip Graham, 2825 Glenmore Ave., Pittsburgh, Pa. 15216

[22] Filed: Aug. 20, 1970

[21] Appl. No.: 65,526

Related U.S. Application Data

[60] Continuation-in-part of Ser. No. 709,999, March 4, 1968, Pat. No. 3,545,789, which is a continuation-in-part of Ser. No. 549,835, May 13, 1966, Pat. No. 3,392,989, which is a continuation-in-part of Ser. No. 462,993, June 10, 1965, Pat. No. 3,262,716, which is a continuation-in-part of Ser. No. 355,568, March 30, 1964, abandoned, which is a division of Ser. No. 97,658, March 22, 1961, Pat. No. 3,129,017, which is a continuation-in-part of Ser. No. 662,770, May 31, 1957, Pat. No. 2,977,135, Ser. No. 709,999 is a continuation-in-part of Ser. No. 549,835; Ser. No. 549,835 is a continuation-in-part of Ser. No. 462,993; Ser. No. 462,933, is a continuation-in-part of Ser. No. 355,568; Ser. No. 355,568 is a division of Ser. No. 97,658 and Ser. No. 97,658 is a continuation-in-part of Ser. No. 662,770.

[52] U.S. Cl. ............................... 280/150 B, 180/112
[51] Int. Cl. ............................................... B60r 21/10
[58] Field of Search ............ 280/150 B; 296/85, 65; 244/122 R; 297/385, 390; 180/112

[56] References Cited

UNITED STATES PATENTS

| | | | |
|---|---|---|---|
| 3,095,170 | 6/1963 | Harb | 297/390 X |
| 1,219,513 | 3/1917 | Wensinger | 296/85 |
| 1,733,371 | 10/1929 | Hall | 296/84 |
| 2,475,588 | 7/1949 | Bierman | 244/122 |
| 2,833,554 | 5/1958 | Ricordi | 280/150 |
| 2,949,299 | 8/1960 | Keith | 297/390 X |
| 3,262,716 | 7/1966 | Graham | 280/150 |
| 3,431,995 | 3/1969 | Kiernan | 280/150 |

FOREIGN PATENTS OR APPLICATIONS

| | | | |
|---|---|---|---|
| 1,074,992 | 2/1960 | Germany | 280/150 |

*Primary Examiner*—Kenneth H. Betts
*Attorney*—William J. Ruano

[57] ABSTRACT

This invention pertains to a cushioning barrier that has shielding mounted closely in front of an operator or a passenger of an automobile or the like, to furnish a high degree of cushioning to the occupant when momentum forces him against the barrier during an accident. The barrier has upper shielding that includes head and torso or chest shields that can easily and rapidly be folded and be moved laterally, then be moved downwardly to inconspicuous positions against a door, so they cannot obscure or obstruct the occupant while they are retracted. Controls that are simple to operate allow the shields to be retracted with motor power operated means or by means to amplify manual force. The head and chest shields can be triggered to cause power means to quickly move them into protective positions in front of the occupant when a dangerous highway condition develops. The present invention does not have the objectionable characteristics of having retraction means that are difficult to retract, and require much time and manual strength to retract, as does the barrier of my U.S. Pat. No. 3,545,789.

20 Claims, 33 Drawing Figures

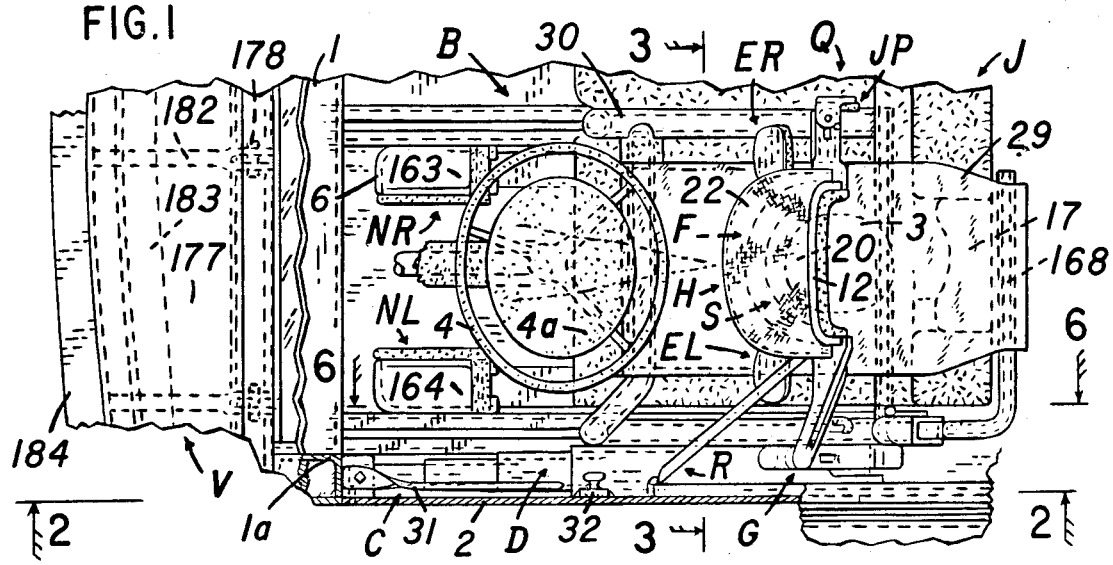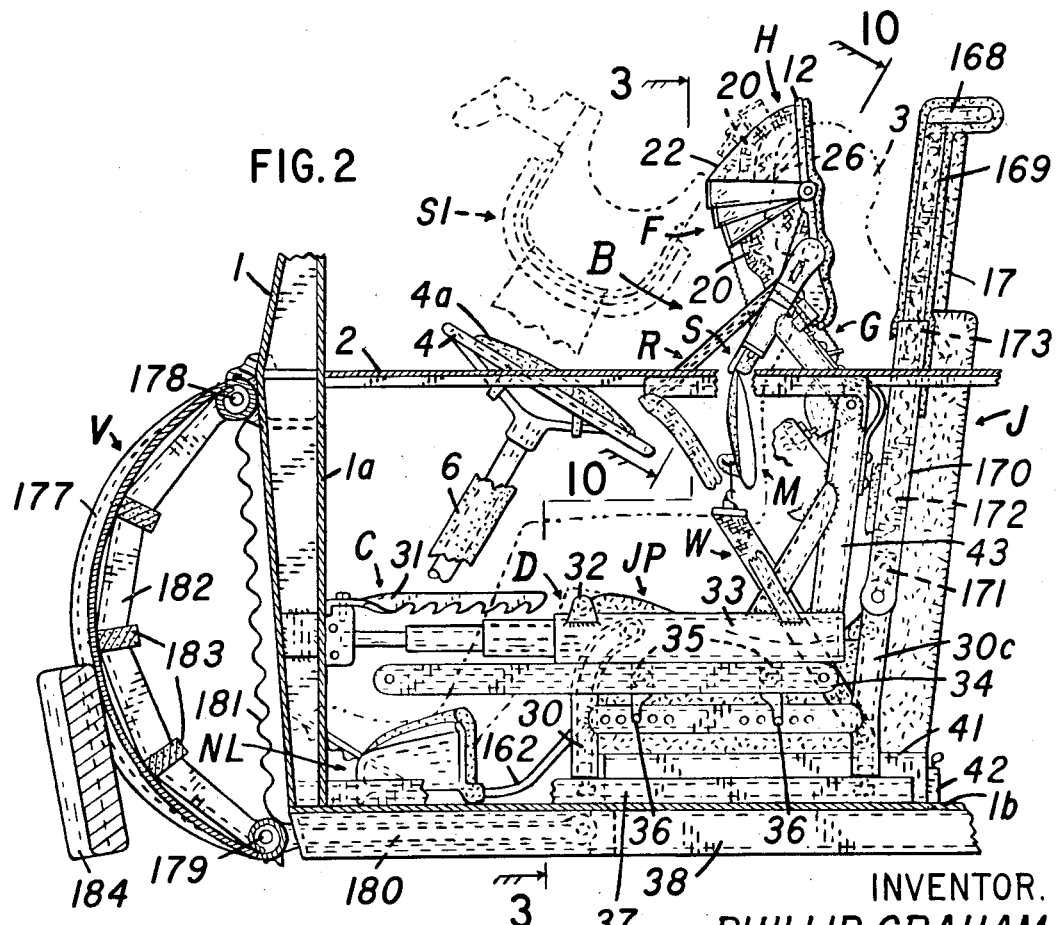

INVENTOR.
PHILLIP GRAHAM
BY *William J. Ruano*
ATTORNEY

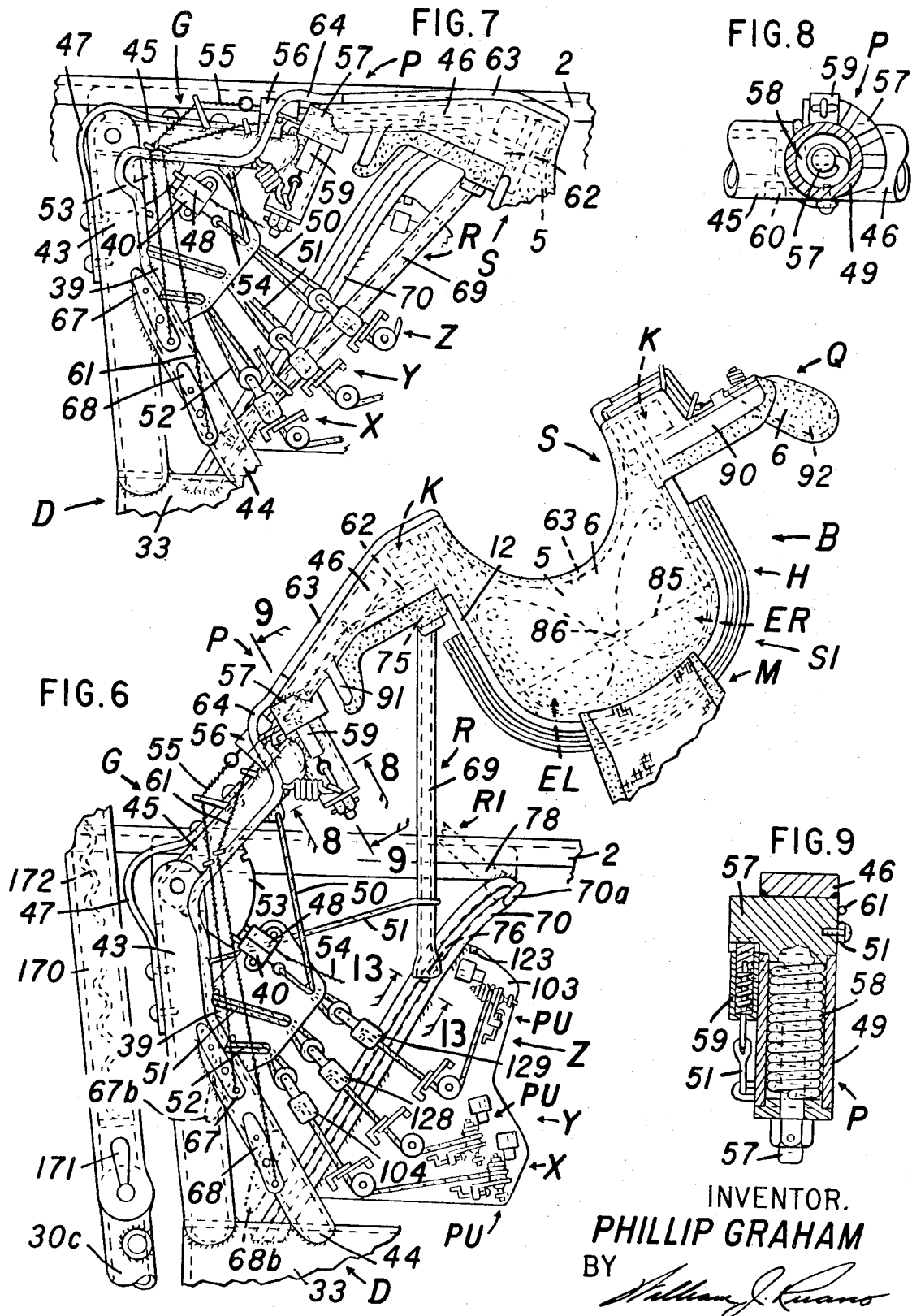

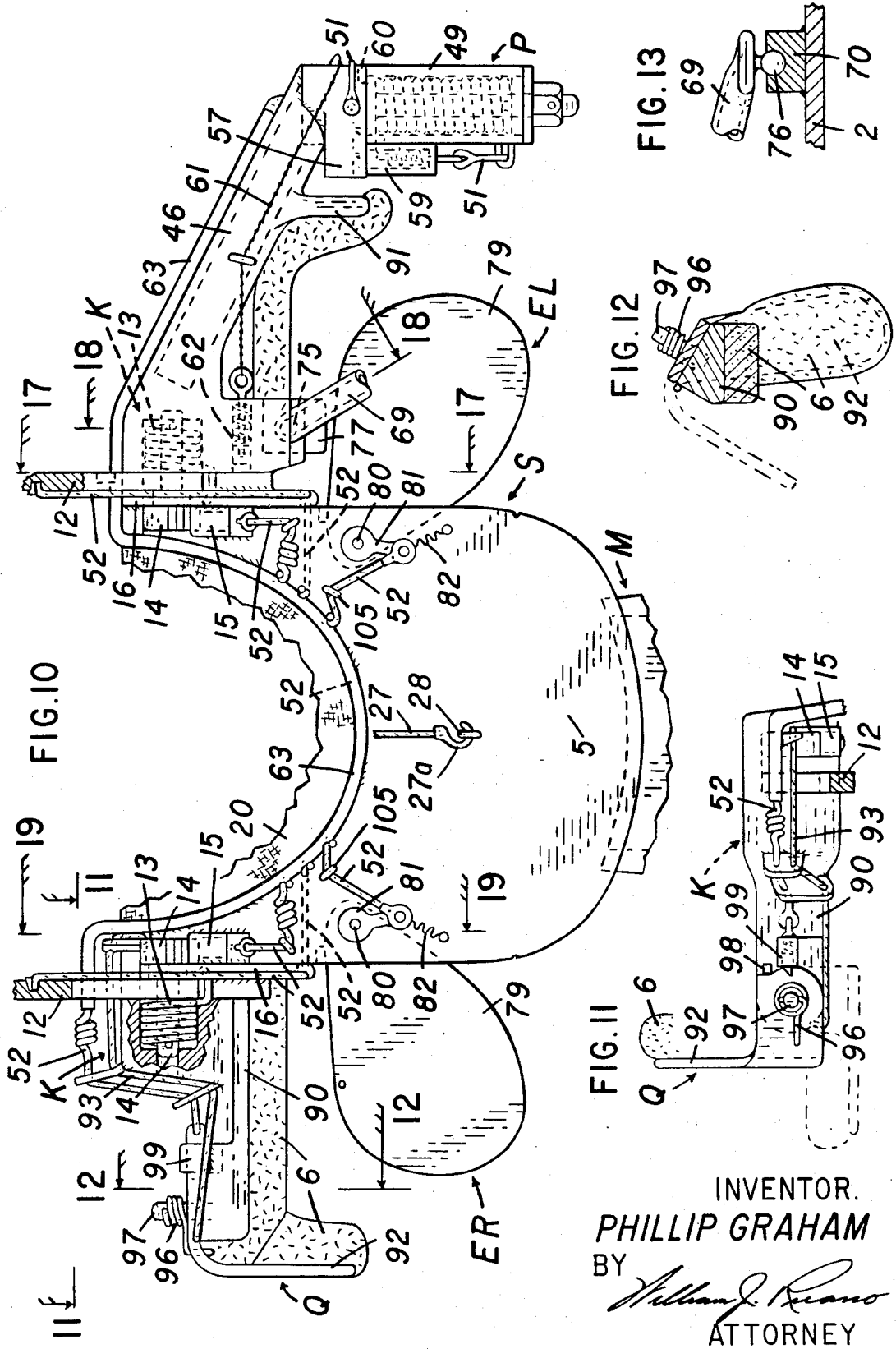

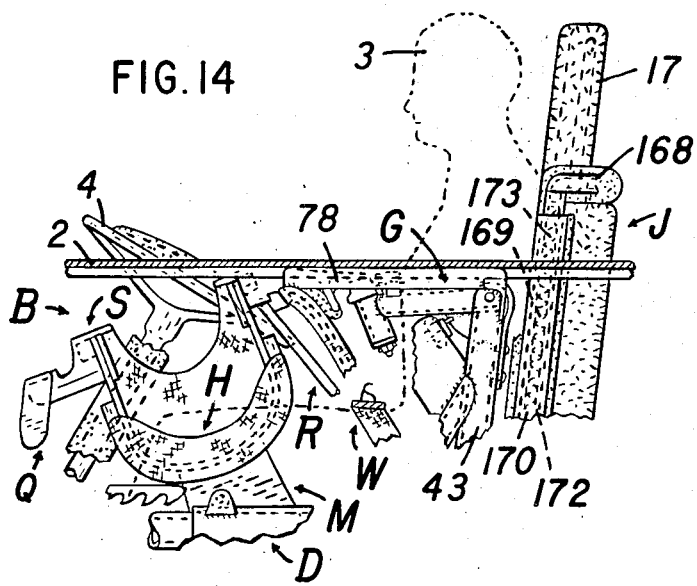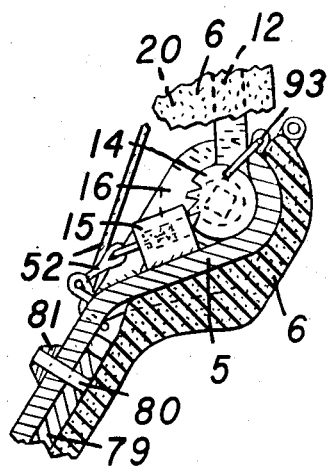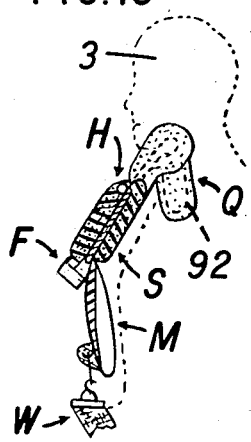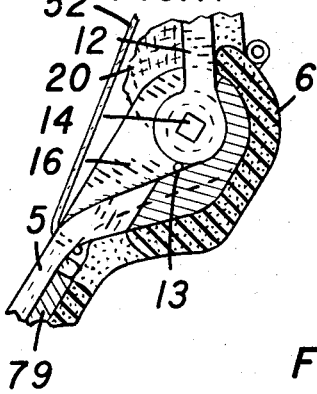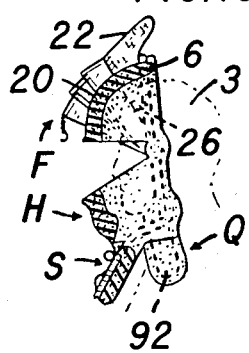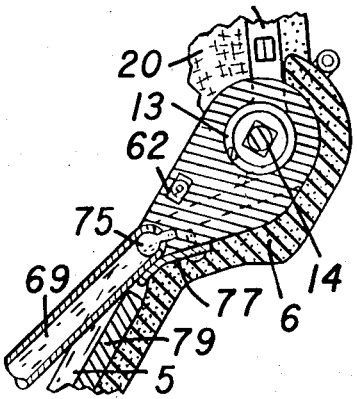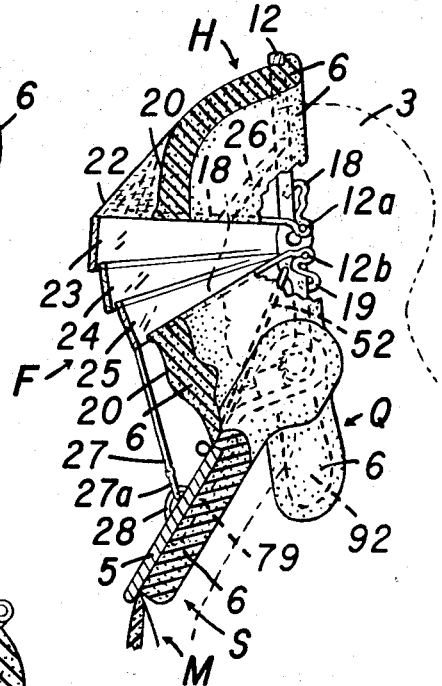

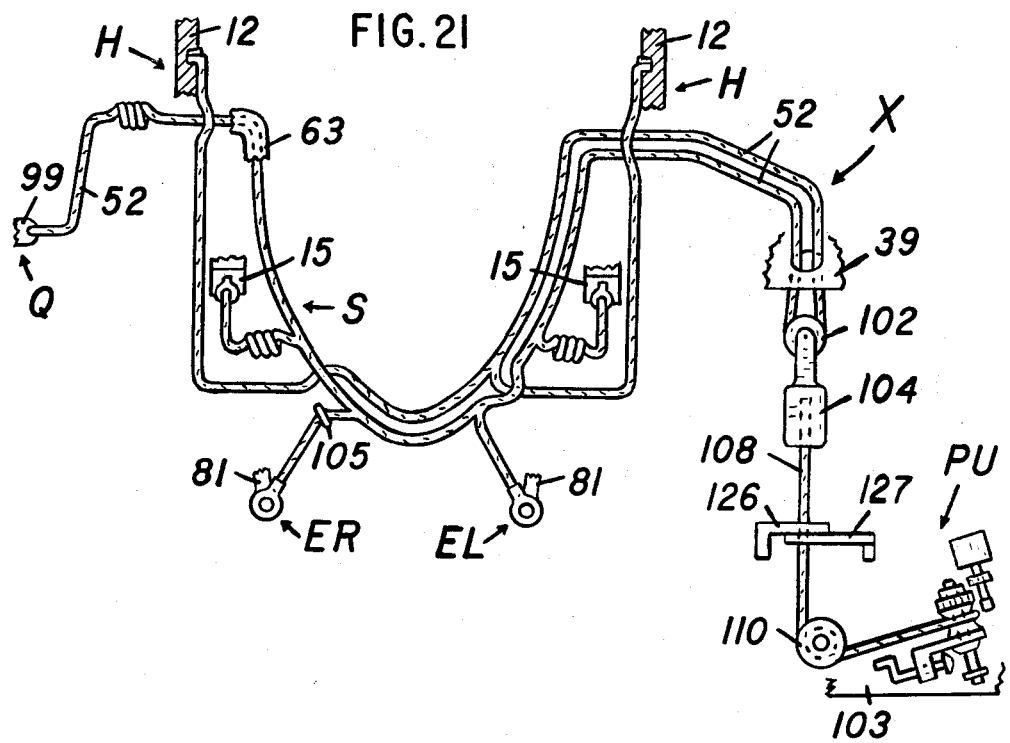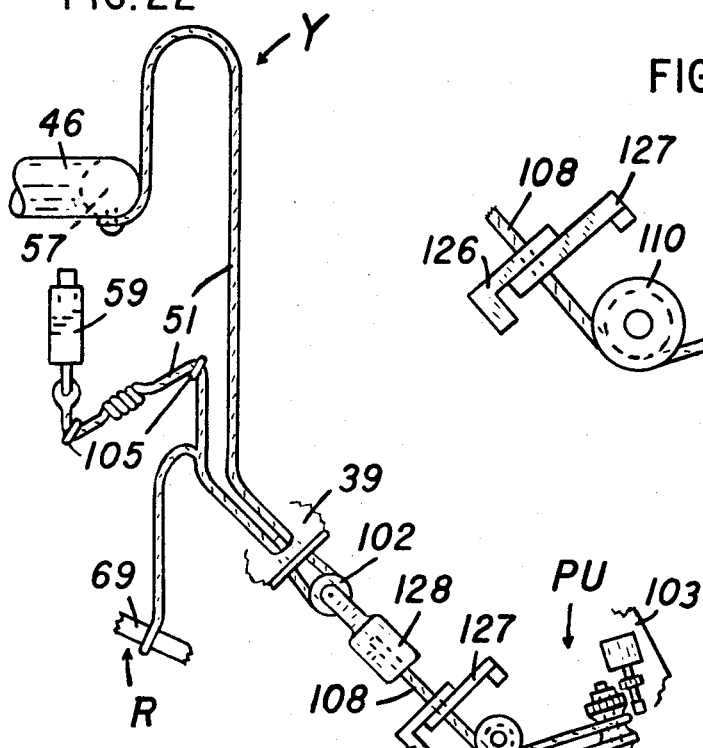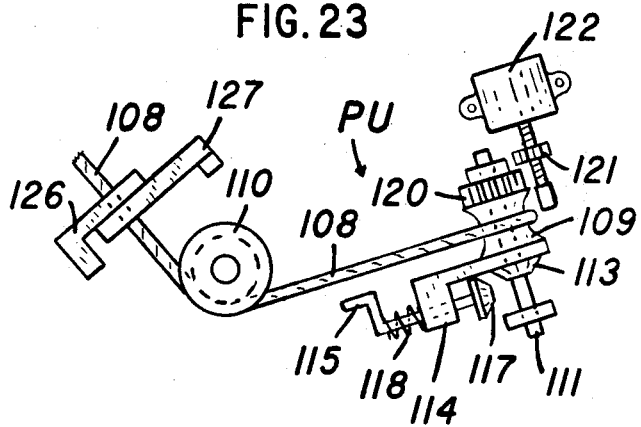

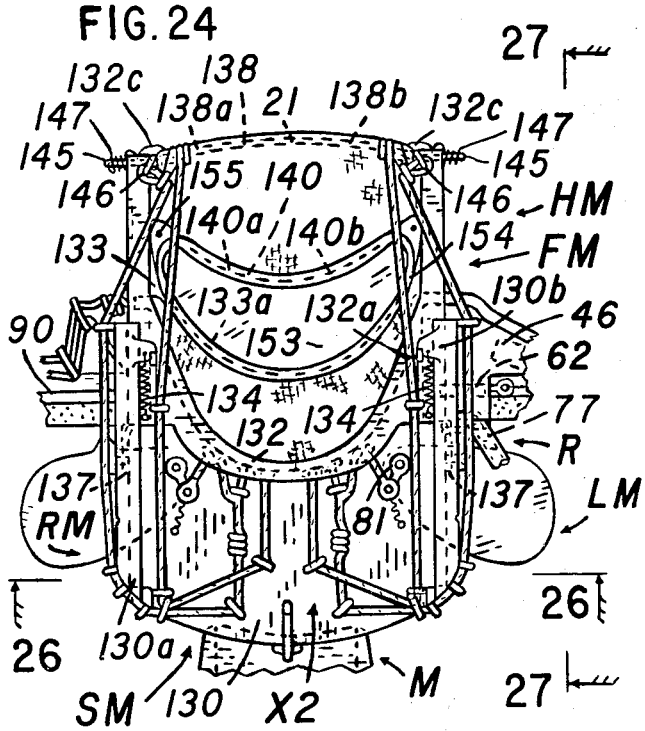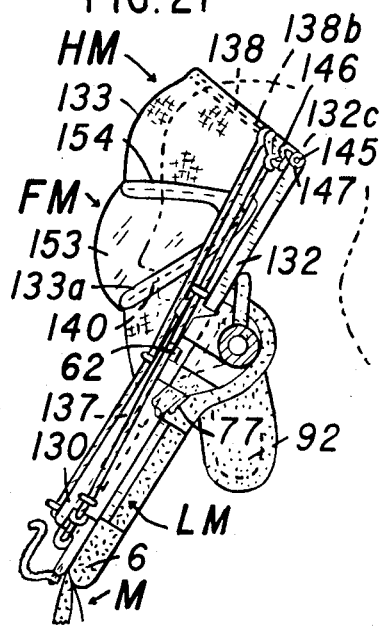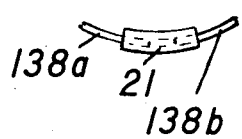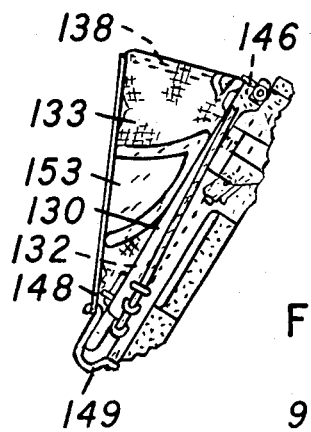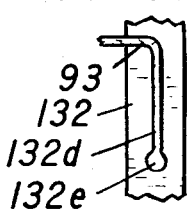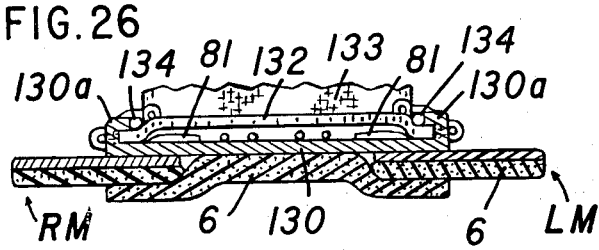

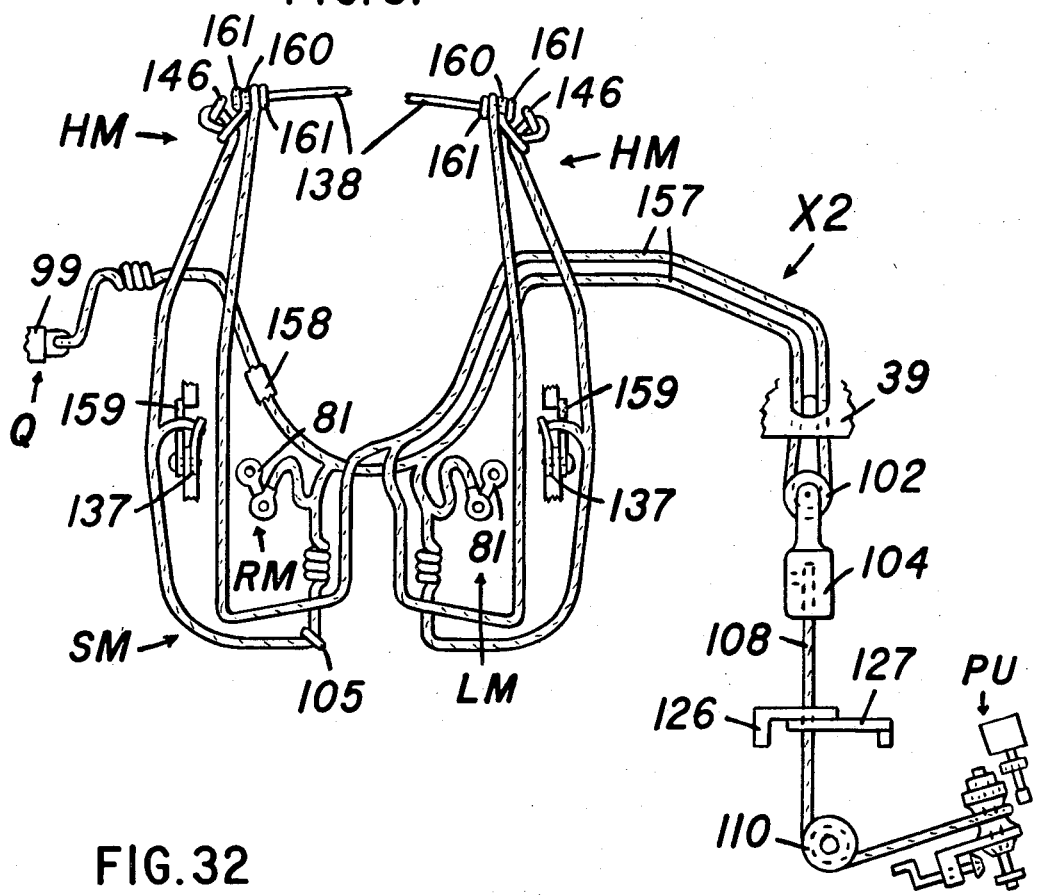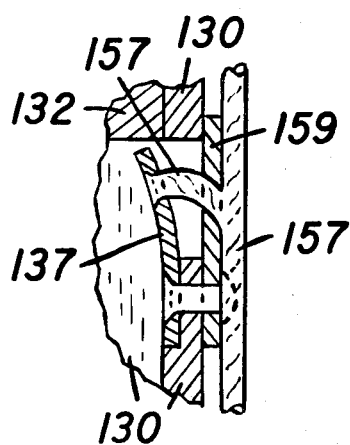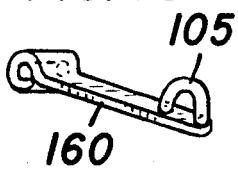

VEHICLE OCCUPANT SAFETY BARRIER

This invention is a continuation-in-part of my co-pending application Ser. No. 709,999, filed Mar. 4, 1968, now U.S. Pat. No. 3,545,789 entitled VEHICLE OCCUPANT SAFETY BARRIER.

Applicant also claims rights to earlier filing date to common subjectmatter that is described in the present application, which was also described in his applications Ser. No. 549,835, filed May 13, 1966, entitled VEHICLE OCCUPANT SAFETY BARRIER, now U.S. Pat. No. 3,392,989; Ser. No. 462,993, filed June 10, 1965, entitled VEHICLE OCCUPANT SAFETY BARRIER, now U.S. Pat. No. 3,262,716; Ser. No. 355,568, which has been abandoned, filed Mar. 30, 1964, entitled VEHICLE OCCUPANT SAFETY BARRIER; Ser. No. 97,658, filed Mar. 22, 1961, now U.S. Pat. No. 3,129,017, entitled VEHICLE OCCUPANT SAFETY BARRIER; Ser. No. 662,770, filed May 31, 157, entitled VEHICLE OCCUPANT SAFETY BARRIER, now U.S. Pat. No. 2,977,135. The co-pending application Ser. No. 709,999 is a continuation-in-part of application Ser. No. 549,835; application Ser. No. 549,835 is a continuation-in-part of application Ser. No. 462,993; application Ser. No. 462,993, is continuation-in-part of application Ser. No. 355,568; application Ser. No. 355,568 is a division of application Ser. No. 97,658 and application Ser. No. 97,658 is a continuation-in-part of application Ser. No. 662,770. The present application also describes improvements over the safety barriers of my U.S. Pat. No. 2,827,305.

This invention relates to a vehicle occupant safety barrier that is mounted in a vehicle and has yieldable shielding mounted closely in front of a seat for an occupant to protect the occupant during a rapid deceleration that is caused by a collision or by power braking. More particularly, it relates to a cushioning barrier that may be positioned in an automobile in front of an operator or a passenger, to furnish a high degree of cushioning to the occupant when momentum forces him against it. Shielding of the barrier may be positioned between an operator and a steering wheel or the like to maintain protection for the operator while allowing him freedom of movement in operating the vehicle, including operating the vehicle throughout an accident period when the vehicle remains controllable. The barrier includes upper shielding, that confronts the head and upper portion of the torso, that can quickly and easily be retracted to a low retracted inconspicuous position, and be kept there until it is needed, so it cannot obscure or obstruct the occupant while it is retracted. The upper shielding can be retracted by a direct pull of a control, or with power amplifying means. By power amplifying means I mean either means to amplify manual force, such as lever or winch means, or means to amplify electric motor power or other motor power, such as gear means. The upper shielding can be quickly moved with power operated means into a protective position in front of an occupant during a collision threat. By power operated means, I mean the application of any type of external motivating power, such as for example, an electric motor, a spring motor, an air motor or a hydraulic motor. There is selective means to allow some portions of the upper shielding to be retracted to limited degrees.

The upper shielding can be kept in non-retracted positions confronting the occupant, but such a limitation would likely be objectionable to an occupant since he would want to retract least the head shield when non-hazardous highway conditions prevail, also when parked, to create additional access space for easier leaving or entering the vehicle. The occupant would want to retract the head shield when viewing scenery or a moving picture at a drive-in theatre.

A frail occupant, such as an elderly person, woman or a child, can readily retract the upper shielding with simple semiautomatic power controls or with simple hand crank winch means, whereas the head shield would be extremely difficult to retract without these retracting means, since the head shield, along with shoulder shields, have seven springs in latches and the like, that must be tensioned to allow retraction. Three springs or the like must be pressured to pivot the upper shielding laterally to a side and two springs must be tensioned to retract the upper shielding downwardly after it has been pivoted aside.

The shielding confines the occupant to prevent momentum from propelling him against rigid portions of the vehicle and the like. The barrier provides shielding that has large cushioning surfaces to which the occupant's body bears during a collision. The large bearing areas allow a low bearing pressure to safely transmit the occupant's momentum force into the shielding, the shielding yielding to an extent as the force is absorbed. There are means to prevent objectionable rebounding of the shielding against the occupant. The shielding may have means to cause the momentum of an operator's body to be harnessed to the barrier to form a battering ram. The battering ram means can bend a steering wheel to lengthen a deceleration path thereby allowing the operator to be decelerated slower and thus safer by reducing the intensity of the bearing pressure of his body against the barrier.

The barrier of the present invention has improvements over the barrier shown in my co-pending application Ser. No. 709,999 and in my older patents. The present application describes improvements that include simple control means to amplify the power of small motor means or amplify manual force, to rapidly retract the upper shielding laterally and downwardly to the extent that it assumes a position that is adjacent and below a side window portion of an automobile or the like, and the retracted position is far enough away from an occupant it is protecting, so the upper shielding does not obscure or obstruct the portions of the occupant's body that are above the hips. The retracted upper shielding is compactly folded so that it fits into a small space beside the lower portion of the door and it is largely hidden or inconspicuous to viewers of the occupant it protects.

There is urgent need for a safety barrier having the protective means and retracting means of the present invention. The present invention would provide a high degree of protection for a vehicle occupant, especially in the protection of the head and chest. There are over two million head injuries each year from automobile accidents. The present invention would provide better protection, than would quickly inflated balloon type cushioners and the like, because the present barrier would provide constant protection, while allowing freedom of movement, including freedom to operate the vehicle. Furthermore, the occupant would not be subject to being struck by the safety barrier, as he would be struck by an inflating balloon, as there is a small gap between the occupant and the barrier, when the barrier is in a protective position. In addition, an occupant's eyes are protected by a recess, which is a necessary protection, particularly when he wears spectacles, including sun-glasses.

The balloon-type cushioner would be a one-time safety device, like a parachute is used only one time before being repacked. Such repacking would take considerable time to accomplish therefore, an occupant would hesitate about tripping a balloon device when there is a possibility of an accident, because once the balloon is inflated, it objectionably confines the occupant and restrains him from moving, including moving to operate the vehicle. On the fast moving congested limited access highways of today, including both city parkways and open country highways, there are so many near accidents, that constant protection is needed, particularly when vehicles are almost bumper to bumper during rush hours, and there is much tailgating and weaving. When vehicles are traveling at today's 70 mile per hour velocity and a balloon cushioner is tripped by an impact on its bumper or by the occupant manually, when another vehicle is critically close, the balloon would inflate too late.

Although the vehicle barrier is shown as being incorporated into an automobile, it may be incorporated into other vehicles.

An object of my invention is to provide a retractable shield-like, cushionable vehicle occupant safety barrier that is mounted in a vehicle, with means to cause the shielding to be positioned closely in front of an occupant to protect the occupant during a very rapid deceleration caused by a collision, shielding that protects the upper portion of the occupant's body, being retractable laterally and downwardly, rapidly with power or manual force amplifying means, when an accident is not imminent, so as not to obscure or obstruct the occupant and so as to hide or make the shielding inconspicuous.

Another object of my invention is to provide a barrier having cushioning shielding that is compactly folded with power or manual force amplifying means, so that it does not obscure or obstruct the upper portion of the occupant when the shielding is in a retracted position, — upper portions of the shielding being mounted on a vehicle door so the upper shielding swings outwardly with the door when the door is opened, thereby providing unobstructed access space to and from the occupant's seat including space to allow the occupant to escape from the vehicle after a collision.

Still another object of my invention is to provide a retractable cushioning vehicle occupant safety barrier that is positioned in front of an interconnected with a slidable portion of a seat of a vehicle, the barrier having shielding with power or manual force amplifying means, to allow it to be easily and quickly folded and retracted laterally and downwardly so that it does not obscure or obstruct the upper portion of the occupant.

A still further object is to provide a cushionable vehicle occupant safety barrier that has retractable shielding positioned in front of, and interconnected with, a slidable portion of a seat of a vehicle, the shielding confronting the operator to harness the operator's momentum during a collision, to cause the barrier to act as a battering ram to bend the steering wheel to lengthen a deceleration path to obtain a longer period in which to decelerate the operator's body during a collision, supports for shielding being positioned so as to allow unobstructed space for access to and from the seat. The shielding has power or manual force amplifying means to cause retracting means to fold the shielding and moves it laterally and downwardly so that it does not obscure or obstruct the upper portion of the operator's body when the shielding is in a retracted position, and the shielding has support means that allows the operator unobstructed space in which to make movements to control the vehicle when the shielding is in a protective position.

Other objects and advantages of the present invention will become more apparent from a study of the following description taken with the accompanying drawings wherein:

FIG. 1 is a fragmentary plan view showing barrier shield means positioned in front of the operator of an automobile;

FIG. 2 is a fragmentary, sectional view taken along line 2—2 of FIG. 1;

FIG. 6 is an enlarged, fragmentary, sectional view taken along line 6—6 of FIGS. 1 and 3 before upper shielding is moved into protective positioning;

FIG. 7 is a view similar to FIG. 6, except that it shows shield supporting means in a fully retracted position;

FIG. 8 is an enlarged, fragmentary, sectional view taken along line 8—8 of FIG. 6;

FIG. 9 is an enlarged, sectional view taken along line 9—9 of FIG. 6;

FIG. 10 is an enlarged, fragmentary view taken along line 10—10 of FIG. 2;

FIG. 11 is a sectional view taken along line 11—11 of FIG. 10;

FIG. 12 is a sectional view taken along line 12—12 of FIG. 10;

FIG. 13 is a fragmentary, sectional view taken along line 13—13 of FIG. 6;

FIG. 14 is a view similar to FIG. 2, but showing upper shielding retracted below a window sill;

FIG. 15 is a view similar to FIG. 4, but showing the head shield in a retracted position;

FIG. 16 is a view similar to FIG. 4 but showing the face shield retracted upwardly;

FIG. 17 is an enlarged, fragmentary, sectional view taken along line 17—17 of FIG. 10;

FIG. 18 is an enlarged, 10; sectional view taken along line 19—19 of FIG. 10;

FIG. 20 is an enlarged, sectional view similar to FIG. 4, showing details of upper shielding;

FIG. 21 is a schematic diagram showing a retraction movement means to quickly and easily retract the head shield and shoulder shields downwardly, and retract the side shield laterally;

FIG. 22 is a schematic diagram showing a retraction movement means to quickly and easily retract the upper shielding laterally;

FIG. 23 is an enlarged detail view showing a typical force means to move shielding to a retracted position;

FIG. 24 is an elevational view similar to FIG. 10, but showing a modification including a slidable head shield;

FIG. 25 is a view similar to FIG. 24 but showing the head shield and a pair of shoulder shields in retracted positions;

FIG. 26 is a fragmentary, sectional view taken along line 26—26 of FIG. 24;

FIG. 27 is an elevational view taken along line 27—27 of FIG. 24;

FIG. 28 is a fragmentary view similar to FIG. 27, but showing a head shield that is partially unfolded;

FIG. 29 is a fragmentary, plan view showing a yieldable splice for stiffening wires;

FIG. 30 is a fragmentary, elevational view showing a groove and pocket for a control cable;

FIG. 31 is a schematic diagram showing retraction movement means to quickly and easily retract the head shield and shoulder shields that are shown in FIG. 24;

FIG. 32 is an enlarged fragmentary sectional view showing details of a spring lock to lock the slidable frame of the modified head shield;

FIG. 33 is an enlarged fragmentary perspective view showing details of a guide pin support and a guide pin.

Figure 3:
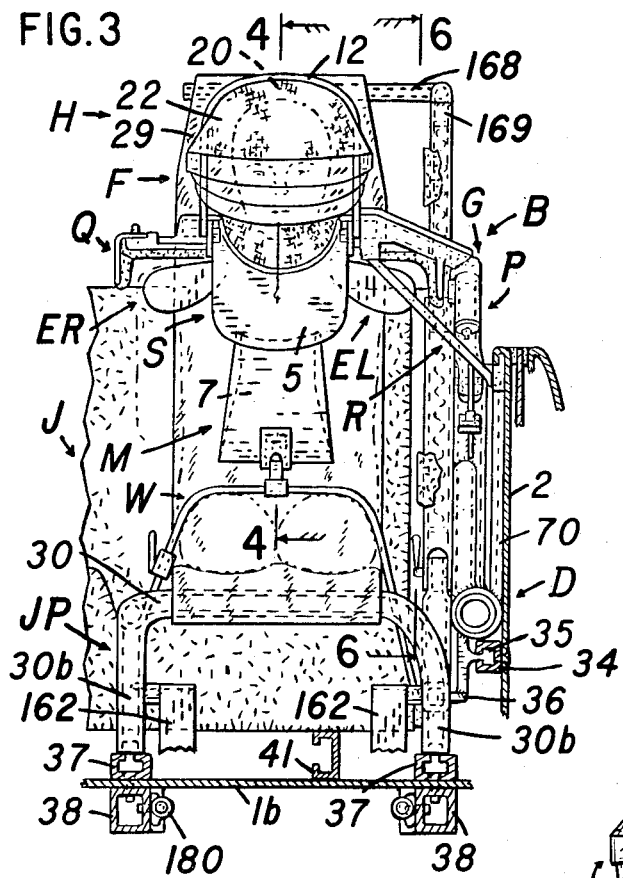
FIG. 3 is a fragmentary, sectional view taken along line 3—3 of FIGS. 1 and 2.

Referring more particularly to the drawings, FIGS. 1 to 23 inclusive show a cushionable safety barrier means B that is mounted in a vehicle body 1, which may be an automobile body. The barrier B includes pivotal, retractable main shielding. The main shielding has a torso or chest shield S that is like a breast plate. The shield S is cantilevered out from a telescoping cushioning thrust arm or cylinder D. The cylinder D is mounted on the interior of a door 2. The shielding of the barrier B confronts an occupant 3. The occupant is positioned in the seat J. The main shielding includes a head shield H which is pivotally mounted on the torso shield S. The head shield H can be retracted downwardly so it overlays the front of the shield S. A transparent visor or face shield F is pivotally mounted on the shield H, to allow it to be retracted upwardly. The shield S is pivotally mounted so as to allow it to be retracted laterally, then downwardly. FIGS. 1 to 5 show the shields S and H in protective positions in front of the occupant 3. FIG. 14 shows the shields S AND H in fully retracted positions. FIG. 15 shows the head shield H in a retracted position, while the torso shield S remains in a protective position. FIG. 16 shows shields S AND H in protective positions, but with the face shield F in an overhead retracted position.

The seat J has a slidable portion JP. The slidable seat portion JP is shown interconnected with the cylinder D and the shielding of the barrier B. A bearing surface means such as the seat belt W is engaged to the slidable seat portion JP. Shoulder shields ER and EL are pivotally mounted on the shield S. Shields ER and EL are retractable to allow an occupant 3, who is the operator, to keep his arms extended while steering, and to allow the shielding to be more compact when it is retracted. When the shoulder shields are in their protective positions, they restrain and thus protect the occupant's shoulders and the upper portions of his arms. The occupant would lower his arms to allow the shields ER and EL to spring into protective positions. The occupant may protect the lower portions of his arms by sliding them into a muff-like portion M of the shield S.

A retractable side shield Q is mounted on the shield S to restrain an occupant from being forced aside during a collision, when the vehicle veers to the left.

The upper shielding can be quickly and easily retracted with retraction movement means X, Y, and Z, that are shown to a large extent in FIGS. 6–11, and 21–23. The movement means X is used to retract the shoulder shields ER and EL, the side shield Q and the head shield H. The movement means Y is used to laterally retract the torso shield S and the shields mounted on it, so they can be positioned adjacent to the inside surface of the adjacent side of the vehicle. The movement means Z is used to downwardly retract the shields and the shields mounted on it, to position all of the upper shields below the window of the vehicle. The movement means X, Y, and Z will be described in detail further on.

Foot shields NR and NL are connected to the slidable seat portion JP. The shields NR and NL restrain and thus allow cushioning of the lower portions of the occupant's legs.

Knee shields, shown in my U.S. Pat. No. 3,392,989, may be fastened to the slidable seat portion JP, to provide bearing surface means confronting the knees.

The shield S is shown positioned between a steering wheel 4 and the occupant 3 who is an operator. The shield S may also be mounted in front of an occupant 3 who is a passenger. The slidable seat portion JP slides forwardly in unison with the shields of the barrier B when the occupant 3 is propelled forwardly against the shields by his momentum, when the vehicle is decelerated quickly, such as when there is a collision or when power braking is fully used. A catch C prevents the thrust arm D and thus the shields from rebounding objectionably after an occupant's momentum has forced the shields forwardly. The shielding of a barrier B may also be positioned in front of conventional vehicle seats or other types of seats (not shown).

Figure 4:
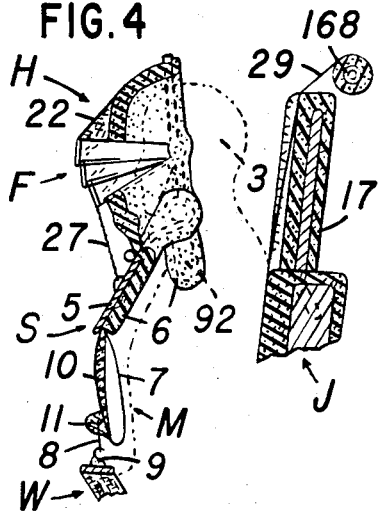
FIG. 4 is a fragmentary, sectional view taken along line 4—4 of FIG. 3.
Figure 5:
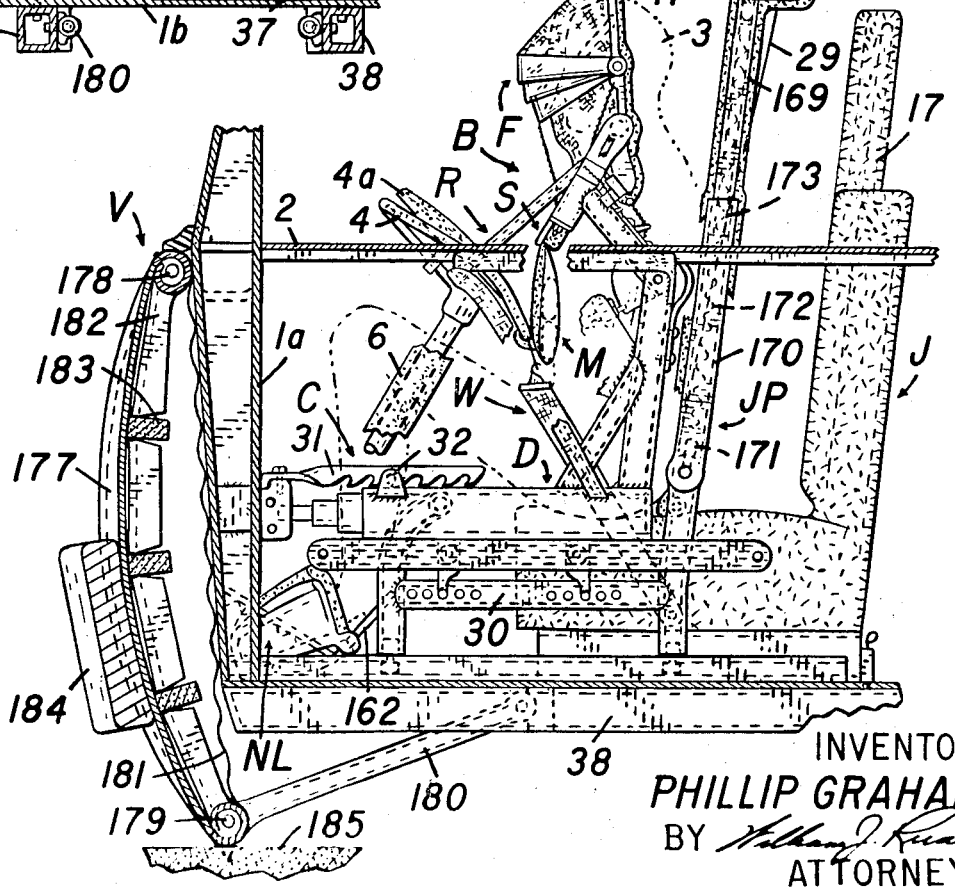
FIG. 5 is a view similar to FIG. 2, but showing barrier shields acting during a collision.

As shown in FIGS. 2, 4 and 20, a gap may be maintained between the occupant 3 and the shields S and H, except when the occupant prefers to bear against the shields when there is imminent danger of a collision accident. During a violent deceleration, such as that from a collision, the occupant 3 would be propelled forwardly from his position shown in FIG. 1 to a position against the shielding of the barrier B, as shown in FIG. 5. The momentum thrust of the occupant 3 against the shields S and H is transmitted into the cylinder D. The momentum thrust of the lower portion of the occupant—s torso and legs against a bearing surface means safety belt W or the like, and the foot shields NR and NL, is transmitted into the slidable seat portion JP, the seat yielding and transmitting the thrust into the cylinder D.

The shield S has a strong stiff panel 5 that can greatly resist forces that tend to deform it during a collision. The panel 5 is covered with cushioning padding 6 adjacent to the occupant. The padding may be sponge rubber or the like, or it may be inflated rubber padding. Cushioning padding 6 may in general be attached to hard surfaces of the barrier B adjacent to the occupant. Such padding 6 is shown, except where the showing would cause vague delineation of mechanical parts that are beyond the padding. The muff-like portion M of the shield S may be made of strong sheeting 7, such as plastic or cloth. The sheeting 7 is looped to form a muff-like shape. The sheeting 7 acts as a hinge where it is attached to the panel 5. The muff M may have a fastener 8 that is engageable with a hook 9 on the belt W. The engagement of the muff M to the belt W prevents the occupant's arms from pivoting forwardly when they are confined in the muff, during a collision. When an occupant has his arms in the muff M, he would tend to interlock his arms by clasping his hands to his elbows. When a muff M is to be positioned between an operator and a steering wheel 4, the muff M may have a strong stiff curved panel portion 10 adjacent to the steering wheel, with padding 6 behind the stiff portion, so occupant's arms are shielded from the steering wheel 4. The strong stiffening 10 may have a hook 11 fastened to it. The hook can engage the lower portion of the steering wheel 4, whereby momentum of the operator 3 against the shielding S and the belt W is harnessed to cause the wheel 4 to deform when the shielding is forced forwardly during a collision. The hook 11 may be covered with padding as shown, to shield the occupant's hands from the hook. A strong padded buffer plate 4a on the steering wheel 4, would coact with the muff M to allow the occupant's momentum to safely deform the steering wheel 4 and its column, to increase the deceleration path for the occupant.

The panel 5 is shown sloping to a small degree to suit an occupant, particularly a woman whose back is resting against the sloping back of the seat J. A barrier B that is made for use with a vertical steering column and a vertically backed seat would have a panel 5 positioned almost vertically for a man occupant. For the purpose of clarity, the shield S is said to be positioned substantially vertically when it is in the protective position.

The head shield H has a strong stiff U-shaped frame 12 that is pivotally mounted with hinges K onto the upper portion of the shield S. Each hinge K includes a coiled spring 13 which tends to cause the frame 12, and thus the whole shield H, to pivot upwardly from a retracted position shown in FIG. 15, to the protective position shown in FIG. 2. Each hinge K has a hinge pin 14. A pair of spring latches 15 are fastened to the panel S. Each hinge pin 14 has a square shoulder that engages a square hole in the frame 12. A large round shoulder portion of a pin 14, engages a hole in a hinge plate 16. Hinge plates 16 are welded to the panel 5. The ends of each spring 13 engages a hole in a pin 14 and a hole in a hinge plate 16. The bolts of the latches 15 engage teeth in the heads of the hinge pins 14, as shown in FIG. 19, to restrain the shield H from pivoting forwardly when the head of the occupant 3 is forced against it by momentum during a collision. The occupant's head is restrained from whipping back excessively by a headrest 17. The head rest 17 has a plug that fits into the back of the seat J.

The shield H has spring steel wires 18 and 19 to form a frame that confronts a portion of the face of the occupant. The wires 18 and 19 are pivotally mounted to pins 12a and 12b on the frame 12 as shown on FIG. 20. The ends of the wires 18 and 19 have corrugations that are hooked into the frame 12. The corrugations act as springs to force the wires into the positions shown in FIG. 20. Tough foldable sheeting 20 is attached to the wires 18 and 19, the frame 12 and the panel 5. The edging of the sheeting 20 has a hem to confine and engage the wires. The sheeting 20 may have padding 6 fastened to it. Thick padding is shown as it would likely be preferred when there is sufficient space between the door 2 and the steering wheel 4 to allow for thickly padded barriers.

When thick padding 6 would be objectionable in thickening the head shield or be objectionable in cost, the head shield H may be made without the thick padding, similar to the use of sheeting without padding as shown in FIG. 27, in which the occupant's head bears directly against the sheeting during a collision. Such sheeting may be made of nylon, so it can yield to an extent to cushion the head. Padding may be used to cushion the occupant's head against the wires 18 and 19, or the wires may be yieldably spliced like the splice shown in FIG. 29, with a thin flexible tube 21 slidably engaging the end portion of the wires, so the wires can safely yield when the head bears against the sheeting 20 that covers the wire.

A tough outer foldable sheet 22 may be attached to the frame 12 and to the face shield F, to prevent broken glass from passing through the gap between the shield F and the sheeting 20. Sheeting 20 and 22 shields the occupant's head from possible showers of fine glass particles that are caused by the cracking of laminated safety glass. Sheeting 20 and 22 would provide some protection from large fragments of windshield glass. Sheeting 20 and 22 may include flexible wire fabric or the like, to resist large fragments of glass.

The transparent face shield F is formed by stiff transparent plastic or the like segments 23, 24 and 25. The segments are pivotally mounted. Segments 23, 24 and 25 have shapes that allow them to telescope or nest compactly. Stepped offsets on frame 12 space the segments so they overlap to provide a shield against falling glass splinters. The gaps between the segments provide a ventilating means. Flanged means or the like on the ends of the segments engage with each other and cause the segments to coact when they are lowered and raised. Elastic-cloth tape springs 26 may be attached to the sides of the frame 12 and to the segment 23, to cause the segments to pivot into the retracted positions shown in FIG. 16. The shield F would be retracted when the occupant prefers an unobstructed opening confronting his face, such as when atmospheric conditions tend to cause fogging of the segments. A cord 27 is attached to the segment 25. The cord 27 has a hook 27a fastened to it. The hook 27a is hooked to an eyelet 28 on the shield S, to hold the segments in the protective positions. The hook 27a is disengaged from the eyelet 28 to allow the segments 23, 24 and 25 to pivot upwardly into retracted positions. The cord 27 may be elastic to allow it to shorten when it rises with the shield F, so it does not dangle in front of the occupant's eyes. There is a large space between the shield F and the occupant's eyes so that spectacles worn by occupant will not touch the shield F during a collision.

The head shield H is wider than the occupant's head, so the shield does not strike the head when the head is positioned slightly off to a side from the center of the shield. The belt W tends to restrain the occupant from being non-aligned with the shield S. Furthermore, the upright portion of the seat J may have a concave shape, like that of a bucket seat, to help keep the occupant aligned with the shields. The head-rest 17 is recessed to allow the occupant to momentarily tilt his head back into the recess to center his head with the shield H, to prevent the shield from striking his head as the shield moves into its protective position.

The shield S is mounted so that it may be pivoted laterally away to the side from the front of the occupant 3, so the shielding does not confront the occupant when there is no immediate danger of a collision. The shield S may be retracted by being pivoted laterally to a side, then downwardly so the shields S and H do not obscure or obstruct the occupant 3 to any extent when there is little danger of a collision. The retracted positions of the shields S and H are adjacent to the door 2, as shown in FIG. 14. The door 2 with the shields S and H retracted against it may be readily swung open and closed without the shielding being a nuisance or a hindrance to the occupant. The shield S along with the shield H can be triggered to force them to move rapidly into the protective positions from the fully retracted positions, when a hazardous condition develops.

The side shield Q may be retracted to create space between the shielding and the back of the seat J to allow the occupant 3 to move from behind the shielding so he can pivot his torso and head downwardly onto the seat J, when the vehicle rolls over during an accident. In general, after a collision, the occupant can retract the side shield Q and slide sideways past the shields S and H, thus he is not likely to be trapped by the shielding. The slidable seat portion JP yields by sliding forwardly without the remainder of the seat J moving forwardly. This means allows the occupant to escape readily from behind the shields S and H, after a collision, as the rigid rear portion of the seat J does not bear against him, thus tending not to trap him. The seat portion JP has a pliable sheet 29, that overlays the fixed portion of the seat J. The sheet 29 may be made of nylon. The slidable seat portion JP has a strong tubular seat base frame 30. The sheet 29 is attached to the front and to the rear of the frame 30. Padding 6 is used to cover the frame 30 adjacent the occupant.

If the catch C deforms during a collision and allows the rear portion of the cylinder D to be propelled backwardly by deformation of the portion of the vehicle 1 that confronts the cylinder D, the seat frame 30 would strike the fixed upright back of the seat J and thus force the seat J backwardly, thereby maintaining space for the occupant between the shield S and the back of the seat J, thus preventing the occupant from being crushed. The seat J may be a conventional automobile seat, with the seat portion JP superimposed on it.

During a collision, when the occupant's momentum is transmitted through the shielding into the cylinder D, the force is absorbed by compressing springs that are confined in tubes of the cylinder D. The cylinder D yields and telescopes when the springs yield. The catch means C prevents the release of the force built up in the cylinder D until it is manually released after the occupant is clear of the path into which the shields rebound. The cylinder D and the catch C are like the cushioning cylinder and catch that are described in my U.S. Pat. No. 3,129,017. The catch C has a spring steel bar 31 that has ratchet teeth. A pin 32 that is fastened to a rear cylinder portion 33 of the cylinder D engages the ratchet teeth when the cylinder is compressed by the occupant's momentum. The ratchet teeth restrain the pin 32 and thus the shielding from moving backwardly when the springs in the cylinder tends to rebound after the forward force has been spent.

A snubber (not shown), similar to a snubber described in my U.S. Pat. No. 2,827,305, may be used if preferred, rather than a catch means C. The cylinder D may have a piston and hydraulic fluid to create bleeding action to cushion some of the momentum force. The hydraulic means to cushion may be in addition to the spring means. The means to use hydraulic bleeding action to cushion the momentum force is fully described in my U.S. Pat. No. 2,977,135. U.S. Pat. No. 2,977,135 also fully described hydraulic means that allows the use of hydraulic fluid and pump means to adjust the shields laterally towards the rear or the front.

The cylinder D may have an adjusting means (not shown) to adjust the force absorbing spring or hydraulic bleeding means to suit the weight of the occupant. Such adjusting means are well known. They include an adjustable diaphragm opening to vary the hydraulic bleeding action and take-up means to vary the spring means.

The front of the cylinder D bears against the corner post 1a or the like, so the forward end of the cylinder D is restrained from moving forwardly. A track 34 on the door 2 supports and positions the cylinder D. Two T-shaped connectors 35 have sliding and interlocking engagement with the track 34. When the door 2 is opened to an extent, two pins 36 which are attached to the cylinder portion 33 retract from spaced holes in the seat base 30. The door 2 has strong hinges and a strong latch (not shown). The door latching may be similar to safe latching shown in my U.S. Pat. No. 2,827,305.

The shielding of the barrier B is adjusted laterally to obtain a position that allows the gap between the occupant 3 and the shields S and H. Air can circulate through the gap to allow the occupant to keep cool during hot weather. The gap tends to prevent chafing and wrinkling of the occupant's clothes. The pins 36 are selectively engaged to the spaced holes in the seat base 30, to allow the seat to be adjusted longitudinally. A seat cushion may be used that is inflatable, so the seat can be adjusted in height, so that persons of various heights can use the same barrier B. Control pedals would have adjustable extension means to suit all operators.

The seat base frame 30 has two front legs 30b and one rear leg 30c. These legs are interlocked with and slidably engage rails 37. The rails 37 are fastened to the floor 1b. The floor 1b may be reinforced with beams 38. The non-slidable portion of the seat J may be mounted on a support 41 and the like. A seat latch 42 may be used to latch the non-slidable portion of the seat to the floor 1b.

As shown in FIGS. 6 and 7, the shield S is mounted on support means which includes a tubular post 43. A plate 39 is welded to the post 43. The plate 39 supports a spring actuated latch 40. The post 43 is fastened to the top of the cylinder portion 33. A tube 44 braces the post 43. A pivotal arm G is mounted on the post 43. The arm G has a lower arm portion 45 that is pin-connected to the post 43. The arm G includes a hinge P.

An upper arm portion 46 is attached to the hinge P. The hinge P has a tube 49 that is rigidly attached to the lower arm 45. The upper arm 46 is rigidly attached to the panel 5 of the shield S. A spring 47 forces the arm G to pivot upwardly in response to tripping of a spring actuated main latch 48. The latch 48 is mounted on the plate 39.

A retraction control cable 50, which is a portion of the movement means Z, is fastened to the latch 40. The latch 40 is pulled to unlatch it, to allow the shield S and the shields it supports, to be readily pulled down into fully retracted positions. Adjacent to the control cable 50, are retraction control cables 51 and 52. The control cable 51 is a portion of the movement means Y. The cable 51 is a portion of the movement means Y. The cable 51 is pulled to cause the shield S and the shields it supports to pivot laterally away from the front of the occupant 3, towards a side of the vehicle. The cable 52 is a portion of the movement means x. The cable 52 is pulled to cause the side shield Q, shoulder shields ER and EL, and the head shield H to retract. Details of the mounting and the use of the cables 50, 51 and 52 will be described further on.

The latch 48 engages the upper notch in a plate 53 to hold the shield S in the low retracted position. The plate 53 is welded to the lower arm 45. When the shield S is in a fully retracted position, and the occupant foresees that a collision is imminent, he can pull a main control cable 54 or pull the handle of the latch 48 to retract the bolt of the latch 48, to allow the spring 47 to quickly force the shields S and H to move upwardly to the position S1 that is shown in FIG. 6, and is indicated by the phantom outline in FIG. 2. After the latch 48 is pulled, a train of latches is automatically tripped to allow the shields S and H to move farther. The latch 40 engages a lower notch in the plate 53, to lock the arm G in the raised position shown in FIGS. 2, 3, 5, and 6. When the arm G reaches an intermediate position that is close to the extreme upper position, the pivotal movement tightens or takes up the slack in a cable 55, causing the cable to pull the control on a spring latch 56, which causes the latch bolt to disengage from a catch notch in a hinge pin 57 of the hinge P. When the latch 56 is disengaged from the hinge pin 57, a coiled spring 58 causes the hinge pin 57 to pivot the arm 46 laterally, thus pivoting the shield S laterally until it reaches a protective position close to the occupant, then a tooth in the hinge pin 57 automatically engages the latch bolt of a spring actuated latch 59. An offset on the pin 57 engages a limit block 60 on the arm 45 to prevent the arm 46 from pivoting past the protective position. Just before the arm 46 completes its lateral pivoting movement, a cable 61 partially wraps around the hinge pin 57 and thus takes up the slack in the cable, causing the cable to pull the control on the spring latch 62, to unlatch its bolt from engagement with a notch in the frame 12 of the shield H, thereby allowing the head shield H to pivot upwardly into the protective position. A strong rigid tube 63 is fastened to the top portion of the panel 5 and the arm 46. The main function of the tube 63 is to provide a means to house and guide portions of the cable 52. The tube 63 stiffens the panel 5, to restrain it from bending. A flexible tube 64 is attached to an end of the tube 63 and it is supported by the tubes 43 and 44 and the arm 45. The tube 64 houses and guides portions of the cable 52 and portions of the cable 51. The tube 64 is flexible so it can bend when the shield S is pivoted laterally and vertically. The tubes 63 and 64 have side openings for branches of the cables 51 and 52.

The springs 47, 58, and other springs that cause the shields to move into protective positions, are motor power means.

Modified means to move the shields into protective positions may readily be substituted for the cables, springs and latches shown. Other types of motors, including electric motors, hydraulic and pneumatic cylinders (not shown) or the like may be used effectively.

The ring control handle of the latch 59 is pulled by the cable 51 to cause unlatching to allow the shield S to be retracted laterally.

The hinge pin 57 has ratchet teeth to cause the bolt of the latch 59 to grip a tooth to prevent the arm 46 from being forced to pivot forwardly when the occupant strikes the shield S before the shield has reached the protective position confronting the occupant. This provides a limited degree of protection when there is not enough time for the shield S to be fully moved into a protective position.

The shield H also includes ratchet teeth on the hinges K, to cause latches 15 to restrain the shield H from pivoting downwardly when the occupant's head strikes it before it reaches the extreme protective position.

The control cable 54 may be attached to the latch 48 and to the firewall of the vehicle. The cable 54 may be rigged so it may be made taut by pressure against it by the occupant's leg or hand, to cause the bolt of the latch 48 to unlatch. The cable 54 allows an operator 3 to keep his hands on the steering wheel 4 while his leg that is not on the brake pedal can pressure the cable 54.

A modification (not shown) may be used, that has a conventional solenoid or the like, to pull the cable 54, in response to a pressure on an electric switch.

When a collision thrust is likely to be from an angle, such as the frequent angular collision thrust that strikes the left front portion of a vehicle, when the operator veers the vehicle just before a collision, the latch 59 and the ratchet teeth on the hinge pin 57, allow the occupant 3 to laterally twist the upper portion of his body and to lean forward to an extent so as to stop the pivoting of the shield S at the desired angle to meet the angular thrust directly.

A pivotal manual control 67 is mounted on the brace 44 with a pin. The control 67 may have a resilient handle and a plug to engage a socket in the brace 44. The handle of the control 67 is pressured to bend it away from the brace 44 to disengage the plug from the socket to allow the control to be pivoted. When nonhazardous conditions are prevalent, the occupant may restrain the shield S from pivoting laterally to the protective position, by pivoting the handle of the control 67 downwardly until the control reaches the position 67b, before pulling the latch 48. A phantom outline indicates the position 67b. This positioning of the control 67 causes the cable 55 to slacken to a great degree, thus the cable cannot pull the latch 56 to cause it to disengage from the notch in the hinge pin 57. When a hazardous condition occurs, the occupant pivots the handle of the control 67 upwardly, causing the cable 55 to pull the bolt of the latch 56 to disengage it from the notch in the hinge plate 57, allowing the shield S to pivot laterally towards the front of the occupant.

When preferred, the occupant may keep the shield H positioned low in the folded position against the shield S, (see FIG. 15), when the shield S is confronting him, by pivoting a manual control 68 to prevent the shield H from automatically pivoting into its protective position. The control 68 is made and mounted like the control 67. The handle of the control 68 is pivoted downwardly until the control reaches the position 68b to prevent the shield H from pivoting into its protective position. This positioning of the control 68 increases the slack of the cable 61, — thus the cable 61 cannot pull the latch 62 to cause it to disengage from the notch in the frame 12. When hazardous highway conditions develop, the occupant pivots the handle of the control 68 upwardly, causing the cable 61 to pull the bolt of the latch 62 to disengage it from the frame 12, allowing the shield H to pivot vertically to the protective position confronting the occupant's head.

A retractable brace R may be used to restrain the arm G and the arm 46 from deforming when the occupant is pressured against the shields S and H. The brace R includes a tubular shaft 69. The brace R is pivotally engaged to the arm 46 and to a brace guide 70. Ball fittings 75 and 76 are fastened to the ends of the shaft 69. The ball 75 engages a socket in the arm 46. The ball 76 engages a slotted track in the brace guide 70. The lower end of the brace R is forced to rise and move laterally by movements of the arm 46, when the shield S is being pivoted laterally into a protective position. A spring sheet clip 77 on the arm 46 bears against the shaft 69 to cause the lower end of the brace to rise to the position R1 on the upper end of the guide 70 when the shield S moves into the protective position. A fragment of the brace R is shown in phantom in the position R1. The spring 77 tends to prevent the ball 76 from binding to the track in the guide 70. The brace guide 70 is welded to the cylinder D. A slidable bar 78 is fastened to the top of the guide 70 and to the post 43. The bar 78 slidably engages the groove-like window sill portion of the door 2. The bar 78 keeps the post 43 and the guide 70 in alignment with the door 2, and allows the brace R to move with the shields. The lower end of the shaft 69 bears against a block 70a on the upper end of the guide 70, when the shield S is in the protective position.

The working position of the brace R is high enough to allow the occupant to freely use his left arm. The brace R may be omitted, but such an omission would require a much stronger and much larger supporting means, especially a stronger hinge P.

The arm G and the brace R can effectively resist the momentum thrust of the upper portion of an occupant against the shields S and H. As the head and upper portion of the torso do not weigh a great amount, because the head is a small mass and the upper portion of the torso is largely hollow, therefore, the momentum thrust is low enough so as to make the arm G and the brace R economically and physically feasible.

The shoulder shields ER and EL may be kept retracted behind the panel 5 until there is need to move them into protective positions. The padding 6 on the shield S adjacent to the shields ER and EL is attached so as to provide pocket means into which the shields ER and EL retract.

Each of the shoulder shields ER and EL has a panel 79. Each panel 79 is pivotally mounted with a pin 80. Each pin 80 has a pin arm 81 that engages a spring 82. Each spring 82 is anchored to the panel 5. The springs 82 force the shields to pivot outwardly from the retracted positions shown in FIG. 6 to the protective positions shown in FIG. 10. The shields ER and EL would preferably be retracted behind the shield S when the shield S is retracted, so they cannot objectionably strike the occupant's arms when the shield S is moved into its protective position. The shields ER and EL are held in their retracted positions by the frame 12. When the latch 62 releases the frame 12, the frame 12 pivots upwardly, thus releasing panels 79 to allow them to pivot outwardly. Limit blocks on the panel 5 limit the pivoting of the panels 79. When the occupant 3 is the operator, his arms may be extended forwardly to an extend while operating the vehicle. Thus when the shield H is pivoted upwardly, the operator's arms would restrain the shields ER and EL from pivoting outwardly. The operator may pivot his arms backwardly just before a collision to allow the shields ER and EL to pivot outwardly into protective positions. When the shields ER and EL are in protective positions, they would tend to limit the reach of the operator's arms to an extent. When an operator 3 prefers to keep the shields S and H in a protective position while travelling, a restraining core 85, as shown in FIG. 6, may be used to keep the shoulder shields retracted until they are needed. A friction type plug and socket connecting means 86 splices the cable. The operator pulls the core 85 to break the connection 86 to allow the shields ER and EL to spring into protective positions. During a collision, occupant's shoulders would tend to pivot forwardly to cause them to bear against the shoulder shields.

The arm 46 and an arm 90 would help restrain an occupant from being hurled towards the ceiling of the vehicle during a roll-over accident. The arm 90 is attached to the panel 5. A fixed side shield 91, along with the retractable side shield Q, may be used to help restrain an occupant from being forced aside during a collision. The shield Q has a shield plate 92. The side shield 91 may be rigidly attached to the arm 46. The shield plate 92 is pivotally mounted, as shown in FIGS. 11 and 12, to allow it to be retracted to the lateral position, shown in FIG. 6. Retraction means of the shield Q allows the shields plate 92 to be retracted to provide additional clearance for the occupant to slide past it after a collision. Retraction of the shield plate 92, also makes the combined shields more compact in thickness so they can clear the steering wheel 4 when the shields are fully retracted. While the shield H is in a retracted position, the shield Q is retracted, as the shield plate 92 is held by a cable 93 that is rigged with plugs to a notch in the plate 92 and a notch in a hinge pin 14. Movement of the frame 12 into a protective position, causes the pin 14 to pivot and slacken the cable 93, which allows a spring 96 on a hinge pin 97 to force the shield plate 92 to move into a protective position. A limit stop 98 limits the pivotal movement of the plate 92. A spring actuated latch 99 restrains the shield plate 92 from pivoting laterally when the occupant's shoulder bears against it. The control handle of the latch 99 may be pulled to allow the shield plate 92 to be pushed into the retracted position, when the occupant wants to slide past it, or when the upper shielding is kept in a protective position and it swings out when the door is opened.

The shield plate 92 may be omitted, particularly when the door 2 has a weak latching means that may fail during a collision and allow the door to swing open. A shield plate 92 would tend to push the occupant out of the vehicle when the door 2 swings open — or the shield plate 92 would push and pivot the occupant down on the seat. The padding 6 on the shield plate 92 would tend to prevent injury to the occupant. The omission or retraction of the shield plate 92, allows the shield S to swing outwardly with the door 2. The hook 9 would deform and release the shield S if the door 2 swung open during a collision. The hook 9 would deform and release the shield S if the shield S is retracted without disengaging the hook 9.

The retraction movement means may include a force unit PU, to pull the cable 52. As shown clearly in FIG. 21, the cable 52 is looped near its center and threaded through a hole in the plate 39. The loop of the cable 52 engages a pulley 102. The pulley 102 is mounted on a plate 103. The plate 103 is fastened to the track 70.

A control knob 104 has a clevis portion that is pin connected to the pulley 102. The cable 52 has branches that are connected to portions of the shielding that are to be pulled to cause the shoulder shields ER and EL, head shield H and side shield Q to be retracted. U-shaped guide pins 105 are used to guide the control cables. The control cables slide in the tubes 63 and 64, like automobile brake cables slide in tubes. The holes in the sides of the tubes, for the cables, are smooth and rounded, so as to allow the cables to slide easily. A round pin at each hole in the tubes, allows the cables to bend without binding or breaking. A pair of branches of the cable 52 are fastened to the pair of pin arms 81 of the shoulder shields ER and EL. A branch of the cable 52 is fastened to the latch 99 of the side shield Q. Another pair of branches of the cable 52 are fastened to the pair of latches 15. A third pair of branches of the cable 52 are fastened to portions of the frame 12 of the head shield H. The cables are wedged into pockets in the side portions of the frame 12. The third pair of branches are rigged partially behind the panel 5. The handle of the control 68 is pivoted downwardly until the control reaches the position 68b, so as to create slack in the cable 61 to allow the bolt of the latch 62 to spring outwardly. A pull of the knob 104, by the occupant or by the force unit PU, first causes the shoulder shields ER and EL to start to retract, then the pulling causes the latch 99 and the latches 15 to be unlatched. After the latches 15 are unlatched, continuing pull of the knob 104 cause the frame 12 to be pulled so it pivots downwardly until it reaches a retracted position where it is latched by the spring latch 62. There is slack in the branches of the cable 52, that engage the latches 99 and 15, to allow the shoulder shields ER and EL to be partially retracted before the latches are unlatched. The slack in the branches is indicated by coiled portions. The connection of the cable 52 to the latch 99, may be of a type that is quickly detachable, to allow the cable 52 to be disengaged from the latch 99, when the side shield Q is to be kept in a protective position, while the shield H is retracted. The cable 93 is unplugged from the plate 92 to allow the shield Q to remain in a protective position while the shield H is retracted.

Since only a very strong person could retract the shields H, Q, ER and EL, by pulling on the knob 104, a force unit PU may be connected to the knob 104 to allow a frail person to retract these shields. A unit PU, as shown in FIG. 23, is a winch means, it includes a cable 108, that is attached to the knob 104 and anchored to a drum 109. A pulley 110 is used to guide the cable 108 to the drum 109. A drum shaft 111 is keyed to the drum 109. The shaft 111 is mounted with brackets to the plate 103. A beveled gear 113 is keyed to the shaft 111. A pivotally mounted crank support 114 is mounted on the shaft 111. A crank 115 is slidably and pivotally mounted on the support 114. A beveled gear 117 is keyed to the crank 115. The crank has a spring 118 to keep the gear 117 away from the gear 113. An occupant 3 or another person can push the crank 115 until the gear 117 meshes with the gear 113, then he can turn the crank 115 to amplify his manual effort and thus pull the cables 108 and 52 to retract the shields H, Q, ER and EL. The crank 115 and the drum 109 act together as a manual winch. After the frame 12 has been caught by the latch 62, the handle of the crank 115 is released, thus allowing the drum 109 to be free to rotate and uncoil the cable 108, when the shield H is forced upwardly into its protective position.

If preferred, occupant may omit pivoting the control 68 downwardly, instead, he may retain the pull on the knob 104, by direct pull on the knob or by holding the crank 115 engaged, after the shields H, Q, ER and EL are retracted until after the movement means Y has been activated for a short period, so the lateral movement of the shields by the movement means Y, slackens the cable 61, causing the bolt of the latch 62 to spring outwardly. Thus the frame 12 is engaged and held by the latch 62. If manual retaining the pull on the knob 104 is too arduous for a frail operator, a pawl or ratchet (not shown) may be mounted on the shaft 111, to hold the knob 104 until after the lateral pivoting slackens the cable 61.

The shaft 111 has a spur gear 120 keyed to it. that is engageable with a spur gear 121 that is mounted on the shaft of the motor 122. The gear 121 is mounted on the motor shaft, similar to the mounting of a gear on an automobile starting motor, in which the gear is forced to move along the motor shaft, when the motor is started, by action against a spiral groove on the motor shaft, and a spring forces the gear to retract on the shaft when the motor stops. The motor 122 for the movement means X is activated by an electric control switch 123, that is shown near the motor in FIG. 6. The switch 123 may be mounted elsewhere if preferred. The plate 103 may be dished so as to provide recesses for the motors 122 and the drums 109.

A limit switch 126 is mounted on the plate 103. The switch 126 has a pivotal forked arm that partially encloses the cable 108 and pivots vertically. When the knob 104 pressures the limit switch 126, the switch opens and the motor 122 is deactivated, and its gear 121 retracts, thus allowing the drum 109 to revolve freely so the cable 108 can unwind when the shield H is forced into its protective position. The unit PU on the movements means X, may have a switch 127 mounted adjacent to the switch 126 to cause the motor on unit PU of the movement means Y to be activated. The switch 127 has a single arm that can be pivoted downwardly by pressure of a knob 104 or the switch 126 to cause the switch 127 to close. The arm of the switch 127 may be pivoted aside, away from the cable 108, to keep the switch open when only the shields, H, Q, ER and EL are to be retracted. The switch 123 can be reset to energize the circuit after the shield H has been forced into its protective position.

The retraction movement means Y may include a force unit PU, to pull the cable 51. As shown clearly in FIG. 22, the cable 51 is looped and rigged to a control knob 128, like the cable 52 is rigged. The knob 128 is like the knob 104. The cable 51 has branches that are connected to yieldable portions of the barrier that are to be pulled to cause the torso shield S along with the shields it supports to be pivotally retracted laterally to a position beside the inside surface of the side of the vehicle. A branch of the cable 51 is fastened to the latch 59. A second branch of the cable 51 is fastened to the hinge pin 57. A third branch of the cable 51 is attached to the lower portion of the tube 69 of the brace R. A manual or powered pull of the knob 128 first causes the lower portion of the tube 69 to retract a little from its end socket position, then the pull causes the latch 59 to unlatch, then further pulling causes the hinge pin 57 to pivot, laterally, thus causing the arm 46 and the shields supported by it to pivot laterally. The limit switch 126 of the movement means Y, stops its motor 122 and its switch 127 activates the motor 122 of the movement means Z. This switch 127 may be pivoted away from the cable 108 when downward retraction of the shields below a window or the like is not wanted.

The retraction movement means Z may include a force unit PU, to pull the cable 50. As shown clearly in FIGS. 6 and 7, the cable 50 is looped and rigged to a control knob 129, like the cable 52 is rigged. An end of the cable 50 is attached to the latch 40, and the other end is fastened to the arm 45. A manual or powered pull of the knob 129 first causes the latch 40 to open, then continuing pull causes the arm 45 to be pulled down into the low retracted position until the latch 48 engages a notch in the plate 39 to hold the shields in the low retracted side positions. When the latch 48 is engaged and the pull on the knob 129 is discontinued, the cable 50 and the cable 108 that are attached to the knob are free to move.

The switch 127 on the movement means Z, may be used to break the circuits to all of the switches except the switch 123, so the circuits do not cause motors 122 to operate while the shields are moving into protective positions. The switch 123 may be a double switch that can simultaneously start the motor 122 of the movement means X and energize the other circuits, so they will act in response to the switches 126 and 127.

After the shields have been retracted, the control 68 is pivoted back to a position that allows the latch 62 to be retracted when the head shield H is to move into its protective position.

The foot shields NR and NL are interlocked and slidably engaged to bent bar rails 162. The bars 162 are attached to the seat portion JP. The foot shields NR and NL have strong shoe-like shells 163 and 164. During a collision, the occupant may quickly move his feet sideways into the shields NR and NL, so the momentum of the feet pressures the feet forwardly against padding 6 in the shells. The shields NR and NL yield with the seat portion JP during a collision. The bars 162 allow the shields NR and NL to stop and/or be pushed backwards towards the seat portion JP during a collision when these shields strike a non-yielding obstruction, such as a deformed portion of the firewall. When the occupant's feet are positioned in the shields NR and NL, the occupant's legs are bent at the knees so the legs are less likely to be stoved when decelerating violently. The bars 162 act as ramps for the shields NR and NL, when the shields stop and the seat portion JP moves closer to them. Ramp action causes the foot shields NR and NL to tilt, thus forcing the feet to tilt so the seat portion JP can move forward farther. The bars 162 tend to restrain the shields NR and NL from moving out of alignment.

The slidable seat portion JP may have backing means to cushion and restrain the flight of an occupant whose head and torso portion are forced backwardly by a rear end collision against the vehicle, just after a head-on collision. The sheeting 29 which is fastened to the seat frame 30, may extend upwardly and be fastened to a horizontal tube 168 that is attached to the mast tube 169. The mast 169 is mounted on a lower mast or tube 170. The mast 170 is pivotally supported by the seat frame 30, so mast means may be tilted if it is used with a conventionable tiltable seat, to allow access to and from the rear seat of a vehicle. A handle 171 is pivoted to lock or unlock the mast 170 from a set position. The tube 169 may be welded to the tube 170 to form a fixed mast means.

The mast means may be retractable so the horizontal tube 168 can be retracted to the position shown in FIG. 14. This retraction of the tube 168 would be useful when the head-rest 17 is omitted. A high head-rest 17 and/or extended mast would not clear the steering wheel 4 when a tiltable seat is tilted to allow access space.

The mast 169 may be a rectangular tube slidably mounted in the tube 170 which would also be rectangular. A spring 172 is confined in the mast tubes. A latching means 173 may be rigged to the barrier latching system to cause the latch 173 to automatically trip when the shield S is tripped. The spring 172 would force the inner mast 169 and the horizontal tube 168 upwardly. When the mast means is retracted and the head-rest 17 is omitted, the sheeting 29 would be slack. When the mast 169 is retracted and a head-rest 17 is used, the horizontal tube 168 would include a spring would take-up spool (not shown), to take up the slack of the sheeting 29. The spool would have a ratchet means to prevent the spool from uncoiling the sheeting 29. A retractable mast 169 may have padding that is hose-like in form.

The extended mast would help prevent the vehicle roof from caving-in during a roll-over accident.

Although I have shown a cylinder D as a force absorbing means to absorb the occupant's momentum during a collision, the supporting means for the shields may be fixed, so the shielding cannot yield forward within the vehicle. The barrier means may have a highly cushionable bumper portion V. The bumper portion V is a force absorbing means on the front of the vehicle to adequately cushion the occupant. Such force absorbing means as the bumper V or the like would be necessary in small vehicles including small automobiles which are so compact that an adequate deceleration path cannot be made within the occupant's compartment. Conventional bumpers yield little without breaking, so they cannot provide adequate cushioning of collision impacts, as can the bumper V. A vehicle occupant safety barrier would be of little value in a vehicle that cannot resist a collision impact that deforms the occupant's compartment to the extent that the occupant is crushed by the deformation. Bumpers that are similar to the bumper V are described in my U.S. Pat. Nos. 3,056,462 and 3,056,627. They describe cushioning means that can absorb a great impact without deforming the occupant's compartment, which would allow the occupant's barrier to act effectively. My U.S. Pat. No. 3,495,676, offers such cushioning along with stop brace means that would allow occupants of a weak light weight automobile that has occupant barriers, to survive, when the light weight automobile is in a collision with a heavier vehicle, such as a heavy automobile, truck or bus.

The bumper V may have a bowed shell or skin 177 that is pivotally mounted with pin means 178 and 179. Spaced pivotal links 180 engage the pin means 179 and pin means on the beams 38. A corrugated steel sheet 181 or the like ties across the bow of the shell 177. Vertical yieldable rib means 182 stiffen the shell 177. Horizontal ribs 183 may be used to spread a localized impact against the bumper V. A collision impact by the object 184 against the shell 177 causes the shell and the rib means 182 to flatten, as shown in FIG. 5, sheet 181 yieldingly resisting the impact force. The sheet 181 may be resilient. The object 184 may be an opposing vehicle. The bumper V would tend to be highly deformed by crushing action in absorbing collision forces, thus the crushing of the bumper V would prevent objectional rebounding of the vehicle. The bumper V tends to raise the adjacent portion of the vehicle, when the lower portion of the bumper V strikes the roadway 185, thereby preventing the opposing vehicle from riding over the vehicle having the bumper V.

When a less costly vehicle occupant safety barrier like barrier B is required, the torso shield and head shield modifications shown in FIGS. 24 to 33 may be used instead of the shields S and H. The modifications include a torso or chest shield SM and a partially slidable head shield HM. The shield HM may have a foldable transparent plastic face shield FM. Shields SM, HM and FM are substantially symmetrical about their vertical axes. The shield SM has a strong stiff panel 130. The panel 130 has a pair of grooved track portions 130a. A U-shaped head shield frame 132 slidably engages the track portions 130a. The frame 132 supports foldable sheeting 133 to which the occupant's head bears during a collision. The sheet 133 may be made of nylon. A pair of coiled springs 134 are attached to the frame 132 and to the offsets 130b on the panel 130. A latch 62 holds the frame 132 in a retracted position until it is tripped.

The springs 134 may be covered with elastic cloth tubes (not shown) to shield the springs from the occupant. A pair of limit stops 132a on the frame 132 engage the offsets 130b to limit the travel of the frame 132 to the protective position shown in FIG. 24. A pair of stops 130c on the lower portion of the panel 130, limits the downward movement of the shields HM to a retracted position. A pair of shoulder shields RM and LM are similar to the shields ER and EL. The intermediate portion of the frame 132 is offset from the panel 130 to create a space for the shoulder shield springs 82 and in the pin arms 81. The frame 132 is locked into a protective position by the spring locks 137 that engage the bottom corners of the frame. The spring locks 137 bend into recesses when the frame 132 is lowered into the retracted position.

The sheeting 133 is folded when the shield HM is retracted. A U-shaped wire band 138 is pin connected to upper end portions of the frame 132. The wire band 138 is formed with two slightly resilient wires 138a and 138b that are yieldably spliced with a thin resilient sleeve 21, as shown in FIG. 29. The wire band 138 raises the sheeting 133 to a protective position. The wires 138a and 138b and the sleeve 21 are encased in a hem in the upper edging of the sheeting 133. The yieldable splicing means allows the band 138 to yield so the force of the occupant's head is taken by the sheeting 133, thus the head is not bruised or cut by the band 138.

The sheeting 133 is fastened to the inner edge portion of the frame 132. The sheeting 133 may have a face opening 133a confronting a portion of the face of the occupant 3. The face opening 133a may have a slightly resilient wire framework 140 encased in the hem of the sheeting opening. The framework 140 may be formed with wires 140a and 140b that are yieldably spliced with a sleeve 21 to form the framework around the face opening. The wires 140a and 140b are looped to form spring hinges that are adjacent to the longitudinal extremities of the face opening 133a. The wire frames 140a and 140b are compressed when the shield HM is retracted.

Padding 6 is used on at least the upper portions of the frame 132 that are closely adjacent to the occupant. If preferred, additional padding 6 may be fastened against the inside of the sheeting 133, like the padding shown for shield H. Such padding would yield locally to allow it to conform to the bone structure of the occupant's head, so as to bear firmly against more of the surface of the head, thus reducing the intensity of the bearing pressure. Pins 145 in the upper extremities of the frame 132 have square shoulders to engage square holes formed by ends of the wires 138a and 138b, and square holes in the spring stop clips 146. Coiled springs 147 pivot the pins 145 and raise the sheeting 133. After the frame 132 is retracted, the sheeting 133 and wires 138 and 140, with or without thick padding 6, would be folded down against the panel 130 to their fully retracted positions shown in FIG. 25.

The folded parts are held in the folded retracted positions by the fabric band 148. The band 148 is fastened to the underside of the panel 130 and it is banded over the folded parts and is hooked onto a spring hook 149. The hook 149 is fastened to the lower edge of the panel 130. When the latch 62 releases the frame 132, the springs 134 are strong enough to bend the hook 149 and release the band 148, as the springs 134 pull the frame 132 upwardly into a protective position.

The releasing of the band 138 allows the springs 147 to pivot the wires 138a and 138b to raise the sheeting 133 into the protective positioning. Offsets 132c on the upper extremities of the frame 132 limit the upward pivoting of the wires 138. The wires 138a and 138b are restrained from pivoting downwardly by the spring stops 146. An end of each stop 146 springs outwardly and over the frame 132 so that it bears against the frame 132 to restrain the wires 138 form pivoting downwardly. When the frame 132 is released by the latch 62, the limit stops 132a pressure the shoulder shield cord 85 to cause the cable plug and socket 86 to disengage, thereby causing the shields RM and LM to pivot into protective positions.

As shown in FIG. 28, the foldable portion of the shield HM may be kept in a partially protective position when the occupant is keeping the shield SM in a protective position. The band 148 may be detached from underside of the panel 130 and be attached to the top of the foldable sheet 133. When the occupant fails to move the control handle 68, to release the shield HM, the lower portion of the occupant's face would contact and bear against the shield HM. When the occupant does trip the latch 62 with the handle 68, the partially retracted shield HM would move into protective position more rapidly than it could move from a fully retracted position.

The face shield FM has a tough foldable transparent plastic sheet 153, such as "MYLAR". The sheet 153 may have a strong sheet edging 154. The shields HM and FM may have grommets that are connected with pins 155 to allow the shield FM to pivot upwardly to a retracted position when atmospheric conditions cause fogging. The shield FM is similar to the foldable transparent face shield described in my U.S. Pat. No. 3,392,989.

The side shield plate 92 can coact with the shield HM. As shown in FIG. 30 a groove 132d and widened pocket 132e is in the portion of the frame 130 that is adjacent to the side shield plate 92. The cable 93 has a knot that is placed in the pocket 132e. A portion of the cable 93 is placed in the groove 132d. When the shield HM is retracted, the cable 93 tightens and pulls the side shield plate 92 into a retracted position. When the shield HM moves into a protective position, the cable 93 slackens thus allowing the shield plate 92 to pivot into its protective position.

The modified shields shown in FIGS. 24-33, may be quickly and easily retracted with a retraction movement means X2, Y and Z. The movement means X2 is similar to the movement means X. FIGS. 31-33 clearly show the principles of the movement means X2. A cable 157 has numerous branches which slide in a tube 158. The tube 158 is fastened to collar-like portion of the panel 130. A pair of branches of the cable 157, retract the shoulder shields, RM and LM. Another pair of branches of the cable 157, retract the spring stops 146 to allow the shield HM to pivot downwardly. Still another pair of branches of the cable 157, retract the spring locks 137 to allow the head shield HM to slide downwardly. A fourth pair of branches of the cable 157, are rigged to pull so as to pivot the head shield HM down and then slidably move the head shield HM down to the retracted position shown in FIG. 25, so the latch 62 engages the latch notch in the frame 132. The band 148 is banded over the folded parts and fastened with the spring clip 149.

The connections of the branches of the cable 157 that retract the shoulder shields RM and LM, may be of a type that is quickly detachable, to allow the branches to be disengaged from the shields RM and LM, when the shields RM and LM are to be kept in protective positions, when the shield HM is retracted.

FIG. 32, shows in detail, a short branch of the cable 157, which projects through a hole in a stiff plate 159 and is attached to a hole in the spring lock 137. When the cable 157 is pulled, the lock 137 is bent towards the plate 159, to allow the frame 132 to slide downwardly when the cable 157 is pulled farther.

A branch of the cable 157 is rigged through a guide pin 105 and attached to a spring stop 146. The guide pin 105 is supported by a guide pin support 160. The support 160 is pivotally attached to the band 138. The support 160 with a guide pin 105 is shown in FIG. 33. Washers 161 are welded to the band 138 to prevent the supports 160 from sliding. A pull of the cable 157, pulls and bends the clip 146 inwardly, allowing the head shield HM to be pulled and be pivoted downwardly, when the cable 157 is pulled further.

Although I have shown and described barrier means that would provide a high degree of protection for an occupant, modifications including sub-combinations may obviously be made to provide limited protection. Barrier means without lateral retracting means to a side, and without downwardly side retraction means to a position below a window, may obviously be used effectively.

The barrier means would obviously be made largely of various types of metals. Strong plastics may obviously be used instead of metal for many parts.

While I have illustrated and described several embodiments of my invention, it will be understood that these are by way of illustration only, and that various changes and modifications may be made within the contemplation of my invention and within the scope of the following claims.

I CLAIM:

1. In a vehicle having a seat means for an occupant, in combination, a main shield means confronting at least upper portions of said occupant, support means mounted in said vehicle, said support means including side mounting means for supporting said main shield means in a substantially vertical protective position so that said upper portions of said occupant can bear against said main shield means when said vehicle decelerates and momentum forces said occupant forwardly, said main shield means including rigid portion means confronting at least the upper portion of the torso of said occupant, said main shield means also including a head shield means confronting at least a portion of the head of said occupant, said head shield means being of a construction to allow the occupant to see therethrough, said main shield means including movable mounting means of said head shield means, retraction movement means including control means, said retraction movement means retracting said head shield means downwardly in response to an operation of said control means, whereby said head shield means can be readily retracted so as not to obscure or obstruct the head of said occupant when non-hazardous conditions are prevalent.

2. A combination as recited in claim 1, wherein said retraction movement means includes power amplifying means.

3. A combination as recited in claim 2 wherein said power amplifying means includes means to amplify manual effort.

4. A combination as recited in claim 2 wherein said power amplifying means includes motor means.

5. A combination as recited in claim 1, wherein said main shield means includes a pair of shoulder shields pivotally mounted on said rigid portion means and confronting shoulders of said occupant, said retraction movement means includes means to retract said pair of shoulder shields to retracted positions adjacent said chest, said main shield means also including spring means and tripping means, said spring means causing said pair of shoulder shields to pivot into positions confronting said shoulders in response to said tripping means.

6. A combination as recited in claim 1, wherein said main shield means includes a side shield means pivotally mounted above a shoulder of said occupant, said side shield means extending downwardly below the side of said shoulder, said retraction movement means including means to retract said side shield means, said side shield means including power means and side tripping means, said power means causing said side shield means to move into position to protect said occupant in response to said side tripping means, whereby said side shield means can be retracted readily to allow said occupant to slide past it.

7. A combination as recited claim 1, wherein said movable mounting means includes at least, in part, a slidable mounting.

8. A combination as recited in claim 1, wherein said movable mounting means includes at least, in part, a pivotal mounting.

9. A combination as recited in claim 1, together with power means, said power means including means to raise said head shield means after it has been retracted, whereby said head can be readily protected.

10. A combination as recited in claim 1, wherein said side mounting means includes lateral pivotal means, said retraction movement means including means to retract said main shield means substantially laterally away from the front of said occupant to a side lateral position beside said occupant, whereby said occupant is free of said main shield means when conditions are non-hazardous.

11. A combination as recited in claim 1, wherein said side mounting means includes pivotal means, said retraction movement means including means to retract said main shield means substantially laterally to a side and to retract it downwardly to a low retracted position beside said occupant, whereby said main shield means can be readily retracted so it does not obscure or obstruct said occupant.

12. A combination as recited in claim 11, wherein said side mounting means is adjacent an interior side portion of said vehicle and wherein said interior side portion includes a lower portion that is opaque, and wherein said retracted position of said main shield means is below the top of said opaque portion, whereby said occupant is not obstructed or obscured by said main shield means when it is retracted.

13. A combination as recited in claim 1, wherein said head shield means comprises frame means mounted on said rigid portion means, said head shield means including head bearing surface means confronting at least the forehead of said occupant, said head bearing surface means comprising foldable sheet means, said head shield means being foldable to retract it downwardly adjacent the chest of said occupant.

14. In a vehicle having a seat for an occupant, in combination, a main shield means confronting at least upper portions of said occupant, support means mounted in said vehicle said support means including mounting means for supporting said main shield means in a substantially vertical protective position so that said upper portions of said occupant can bear against said main shield means when said vehicle decelerates and momentum forces said occupant forwardly, said support means engaging said main shield means at substantially shoulder height, said mounting means including movable mounting means, said movable mounting means including control means, said main shield means retracting laterally to a side in response to movement of said control means.

15. A combination as recited in claim 14, wherein said movable mounting means includes means to retract said main shield means downwardly to a low retracted position beside said occupant in response to said control movement.

16. A combination as recited in claim 15 wherein said support means is adjacent an interior side portion of said vehicle and wherein said interior side portion includes a lower portion that is opaque, and wherein said retracted position is below the top of said opaque portion, whereby said occupant is not obstructed or obscured by said main shield means when it is retracted.

17. In a vehicle having a seat means for an occupant, in combination, a main shield means confronting at least upper portions of said occupant, support means mounted in said vehicle, said support means including side mounting means adjacent one side of said occupant for supporting said main shield means in a substantially vertical protective position so that said upper portions of said occupant can bear against said main shield means when said vehicle decelerates and momentum forces said occupant forwardly, said main shield means including rigid portion means confronting at least the upper portion of the torso of said occupant, said main shield means also including a head shield means confronting at least a portion of the head of said occupant, said head shield means being of a construction to allow the occupant to see therethrough, said main shield means including movable mounting means of said head shield means, power means including means to retract said head shield means downwardly adjacent the chest of said occupant, said power means including means to raise said head shield means into a protective position.

18. A combination as recited in claim 17, wherein said power means includes means to retract said main shield means laterally aside and wherein said power means includes means to move said main shield means into a protective position.

19. A combination as recited in claim 18, wherein said power means includes means to retract said main shield means downwardly beside said occupant and wherein said power means includes means to raise said main shield means.

20. In a vehicle having a seat means for an occupant, in combination, a main shield means confronting at least upper portions of said occupant, support means mounted in said vehicle, said support means including side mounting means for supporting said main shield means in a substantially vertical protective position so that said upper portions of said occupant can bear against said main shield means when said vehicle decelerates and momentum forces said occupant forwardly, said main shield means including rigid portion means confronting at least the upper portion of the torso of said occupant, said main shield means also including a head shield means confronting at least a portion of the head of said occupant, said head shield means being of a construction to allow the occupant to see therethrough, said main shield means including movable mounting means of said head shield means, power means including means to retract said head shield means downwardly adjacent the chest of said occupant, said power means includes means to raise said head shield means into a protective position, said head shield means comprises frame means mounted on said rigid portion means, and wherein said head shield means includes head bearing surface means confronting at least the forehead of said occupant, said head bearing surface means comprising foldable sheet means.

* * * * *